United States Patent [19]
Yamamoto

[11] Patent Number: 5,606,741
[45] Date of Patent: Feb. 25, 1997

[54] DIGITAL AUTOMOBILE TELEPHONE HAVING ADJUSTABLE RECEIVING PERIOD

[75] Inventor: Shuji Yamamoto, Tokyo, Japan

[73] Assignee: Kyocera Corporation, Kyoto, Japan

[21] Appl. No.: 214,812

[22] Filed: Mar. 17, 1994

[30] Foreign Application Priority Data

Mar. 24, 1993 [JP] Japan .................................. 5-090650

[51] Int. Cl.⁶ ..................................................... H04B 1/16
[52] U.S. Cl. ......................................... 455/343; 455/38.3
[58] Field of Search ................................... 455/343, 54.1, 455/67.1, 67.3, 63, 226.1, 226.2, 38.3, 227, 38.2, 229; 375/75, 377; 370/95.1

[56] References Cited

U.S. PATENT DOCUMENTS

| | | | |
|---|---|---|---|
| 4,736,461 | 4/1988 | Kawasaki et al. | 455/343 |
| 4,777,655 | 10/1988 | Numata et al. | 455/76 |
| 5,179,724 | 1/1993 | Lindoff | 455/76 |
| 5,241,691 | 8/1993 | Owen | 455/54.2 |

FOREIGN PATENT DOCUMENTS

| | | |
|---|---|---|
| 0216635 | 10/1985 | Japan . |
| 0103523 | 5/1988 | Japan . |
| 4345330 | 12/1992 | Japan . |
| 525413 | 4/1993 | Japan . |

*Primary Examiner*—Reinhard J. Eisenzopf
*Assistant Examiner*—Lee Nguyen
*Attorney, Agent, or Firm*—Loeb & Loeb LLP

[57] ABSTRACT

A digital TDMA automobile telephone having a receiving circuit includes a receiving period control unit having a receiving period processing part, a control switch, and a field intensity detecting circuit or a bit error detecting circuit. The receiving period control unit is connected to the receiving circuit to determine an optimum receiving period according to the field intensity of a received signal or bit errors therein, which are detected during reception of a radio wave, thereby stabilizing the reception. In addition, the control switch is on/off controlled on the basis of the determined receiving period to thereby control the power supply for the receiving circuit.

5 Claims, 8 Drawing Sheets

DIGITAL AUTOMOBILE TELEPHONE HAVING ADJUSTABLE RECEIVING PERIOD

BACKGROUND OF THE INVENTION

The present invention relates to a digital automobile telephone in which the BCCH (Broadcast Channel) receiving period is controlled on the basis of the field intensity of the received radio wave, thereby achieving stable reception and saving electric power.

In recent years, the demand for automobile telephones has been increasing, and from the viewpoint of effectively utilizing radio waves, TDMA (Time Division Multiple Access) automobile telephones have been developed as substitutes for the conventional FDMA (Frequency Division Multiple Access) automobile telephones.

The latter type is generally called "digital automobile telephone". Standards for the digital automobile telephone have already been provided (Radio System Development Center (Japan): RCR-27, 27A, and 27B). According to the standards, when a mobile station is waiting, it is required to receive BCCH containing notification information and PCH (Paging Channel) containing incoming information, which are constantly sent from a base station. Particularly, it is compulsory for the mobile station to receive BCCH periodically.

FIG. 1 is a block diagram showing an example of the arrangement of a conventional digital automobile telephone. In the figure, an operation unit 8 constitutes a telephone operating device. An input signal from the operation unit 8 is output to a system control unit 5 through an operation interface 7.

A call control unit 6 performs a call-out operation for a destination under the control of the system control unit 5. The call control unit 6 also performs a call-in operation for a call-in signal that is input thereto from a radio channel processing unit 1 through the system control unit 5.

A speech processing unit 2 performs the following operations under the control of the system control unit 5. That is, the speech processing unit 2 converts speech data into human speech and outputs it to a receiver 3, and it also converts human speech, which is input from a transmitter 4, into speech data and outputs it to the radio channel processing unit 1 so that the speech data is transmitted from an antenna 10.

However, when BCCH is periodically received according to the standard rules, the following problems may arise, depending upon the condition of radio waves:

Firstly, when the radio field intensity is high, or when the condition of reception is very good, BCCH information can be stably received, but yet the same content is received many times uselessly, resulting in a waste of electric power.

Secondly, when the radio field intensity is low, or when the condition of reception is poor, reception of BCCH information is unstable. Therefore, although the base station repeatedly sends the same content, erroneous information is received due to noise or other interference each time reception is performed.

SUMMARY OF THE INVENTION

In view of the above-described circumstances, it is an object of the present invention to provide a digital automobile telephone in which the BCCH receiving period is controlled on the basis of the field intensity (electric field strength) of the received radio wave, thereby stably receiving BCCH and further reducing the power consumption.

A gist of the present invention resides in that in a TDMA automobile telephone having a receiving circuit 1-2, as shown in FIG. 2, a receiving period control unit 9 having a receiving period processing part 9-1, a control switch 9-2 and a field intensity detecting circuit 9-3 is connected to the receiving circuit 1-2, and that during reception of radio waves, the field intensity of the received radio wave is detected by the field intensity detecting circuit 9-3, and an optimum receiving period is determined according to the detected field intensity in the receiving period processing part 9-1, thereby stabilizing the reception, and further the control switch 9-2 is on/off controlled on the basis of the determined receiving period to thereby control the power supply for the receiving circuit 1-2.

Another gist of the present invention resides in that in a TDMA automobile telephone having a receiving circuit 1-2, a receiving period control unit 9 having a receiving period processing part 9-1, a control switch 9-2 and a bit error detecting circuit 9-4 is connected to the receiving circuit 1-2, and that during reception of radio waves, a bit error in the received signal is detected in the bit error detecting circuit 9-4, and an optimum receiving period is determined according to the bit error in the receiving period processing part 9-1, thereby stabilizing the reception, and further the control switch 9-2 is on/off controlled on the basis of the determined receiving period to thereby control the power supply for the receiving circuit 1-2.

The above-described arrangement of the digital automobile telephone according to the present invention provides the following advantages: Since the receiving period is controlled so as to be optimized according to the field strength of the received radio wave in the receiving period processing part 9-1, the mobile station can receive the BCCH signal even more stably regardless of whether the field intensity of the radio wave from the base station is high or low. Further, when the field intensity of the received radio wave is high, the receiving period (sampling period) becomes relatively long, and hence the power supply for the receiving circuit 1-2 can be cut off for a long period of time. Accordingly, the power consumption is minimized.

DESCRIPTION OF THE PREFERRED EMBODIMENTS

Figure 2:
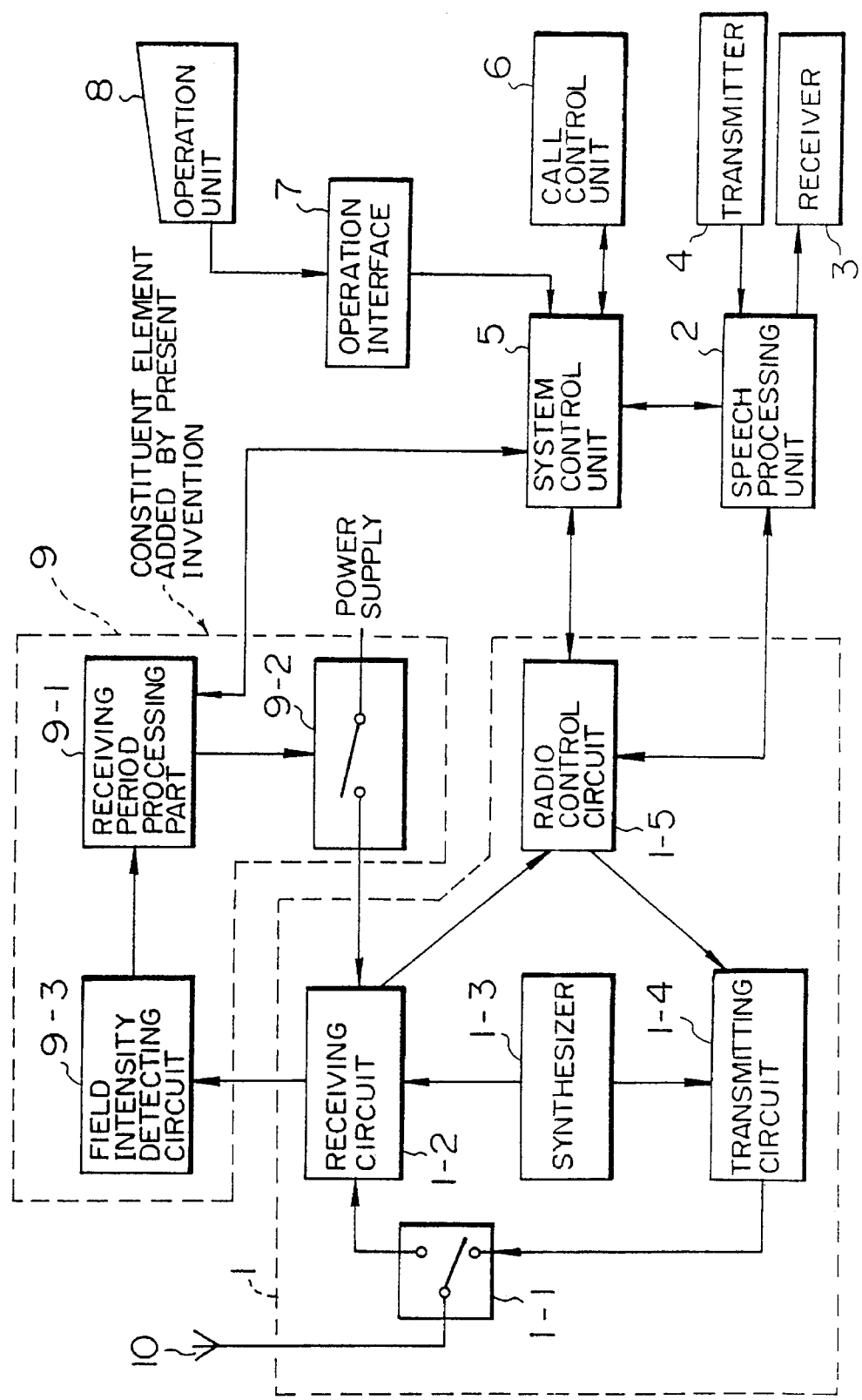
FIG. 2 is a block diagram showing one example of the arrangement of the digital automobile telephone according to the present invention.

One embodiment of the present invention will be described below in detail with reference to the accompanying drawings. FIG. 2 is a block diagram showing one example of the arrangement of the digital automobile telephone according to the present invention. As shown in the figure, the automobile telephone of this embodiment includes a radio channel processing unit 1, a speech processing unit 2, a receiver 3, a transmitter 4, a system control unit 5, a call control unit 6, an operation interface 7, an operation unit 8, and a receiving period control unit 9. The receiving period control unit 9 is a constituent element that is additionally provided according to the present invention.

The radio channel processing unit 1 includes a duplexer 1-1, a receiving circuit 1-2, a synthesizer 1-3 for frequency conversion, a transmitting circuit 1-4, and a radio control circuit 1-5.

The receiving period control unit 9 includes a receiving period processing part 9-1, a control switch 9-2, and a field intensity detecting circuit 9-3.

Figure 1:
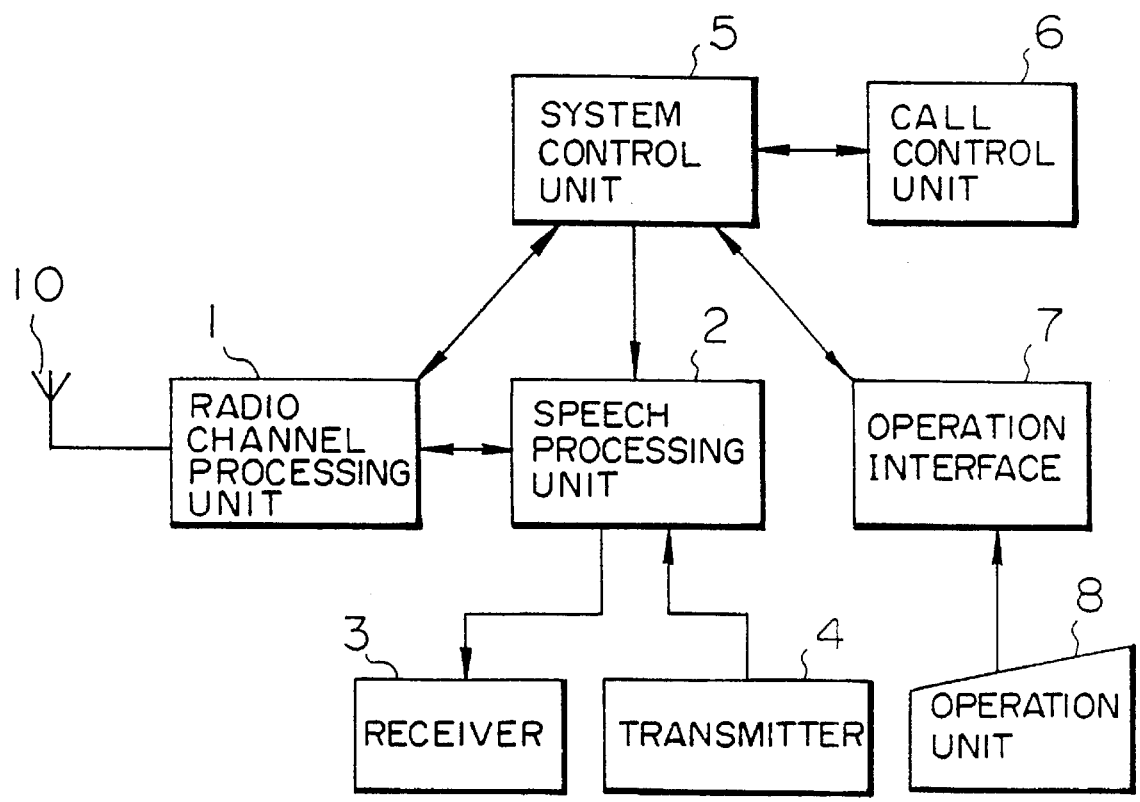
FIG. 1 is a block diagram showing one example of the arrangement of a conventional digital automobile telephone.

An input signal from the operation unit 8 is output to the system control unit 5 through the operation interface 7. The call control unit 6 performs a call-out operation for a destination under the control of the system control unit 5. The call control unit 6 also performs a call-in operation for a call-in signal that is input thereto from the radio channel processing unit 1 through the system control unit 5. The speech processing unit 2 performs the following operations under the control of the system control unit 5. That is the speech processing unit 2 converts speech data into human speech and outputs it to the receiver 3, and it also converts human speech, which is input from the transmitter 4, into speech data and outputs it to the radio channel processing unit 1 so that the speech data is transmitted from an antenna 10. The above-described operation is the same as that of the conventional digital automobile telephone shown in FIG. 1.

The receiving period control unit 9 is controlled by the system control unit 5. When the telephone enters a waiting state, the receiving period control unit 9 begins its control operation. That is, the receiving period control unit 9 inputs the field intensity (RSSI) of the signal received over a presently synchronized radio channel from the radio channel processing unit 1. The receiving period control unit 9 can set and change a BCCH receiving period according to the value of the input field intensity.

In the digital automobile telephone arranged as shown in FIG. 2, when the receiving time has come, the receiving period processing part 9-1 turns on the control switch 9-2 to connect the power supply to the receiving circuit 1-2, thereby activating the latter to send the received signal to the field intensity detecting circuit 9-3.

The field intensity detecting circuit 9-3 detects a field intensity from the received signal sent thereto and sends the detected signal to the receiving period processing part 9-1.

The receiving period processing part 9-1 adjusts the receiving period according to the detected field intensity and controls the control switch 9-2 according to the receiving period.

In the meantime, the control signal in the received signal is sent to the system control unit 5 through the radio control circuit 1-5, while the voice signal is sent to the speech processing unit 2 where it is processed.

It is necessary in order to stably receive BCCH to maintain the bit error rate in the received data at a low constant level.

It is known in digital automobile telephones that the relationship between the received signal field intensity (RSSI) and the bit error rate when there is an influence of fading is generally such that below a specific received signal field intensity, the bit error rate is proportional to the reciprocal of the received signal field intensity, while above a specific received signal field intensity, the bit error rate is approximately constant.

In addition, since bit errors due to fading often appear as burst errors, bit errors are likely to occur concentratively in data received by the first reception.

Therefore, with a view to stably receiving BCCH data, when the received signal field intensity (RSSI) lowers, the receiving period processing part 9-1 controls the control switch 9-2 such that the receiving period is shortened, or reception is continuously carried out, thereby allowing the receiving circuit 1-2 to obtain a predetermined number of times that normal bit data is received in unit time.

Figure 4:
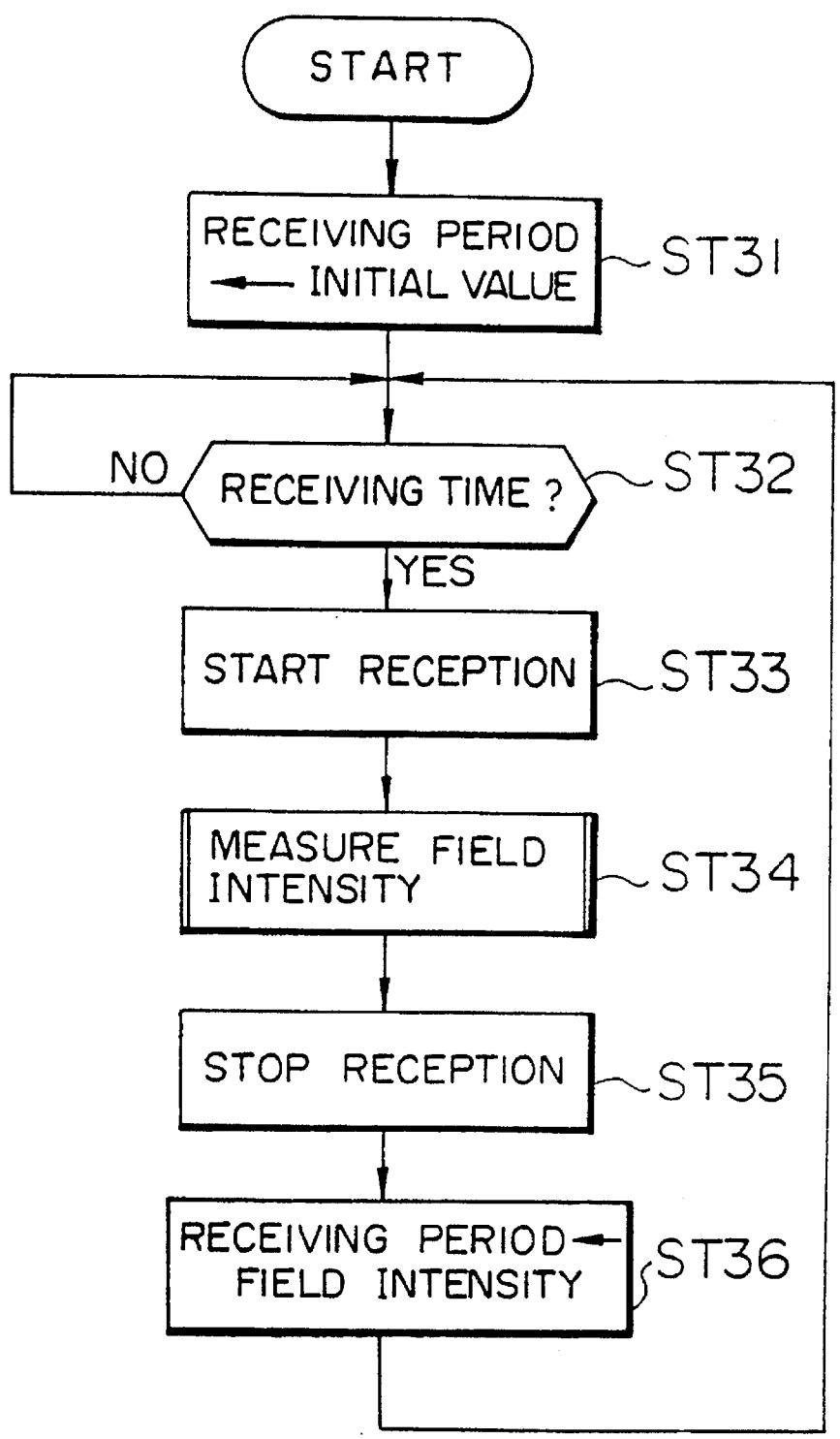
FIG. 4 is a control flowchart for the digital automobile telephone shown in FIG. 2.

FIG. 4 is a control flowchart for the embodiment of the present invention which is stated in claim 1. The operation of the receiving period control system will be explained below with reference to the figure. The control flow is executed in the receiving period processing part 9-1. First, a fixed period is set as an initial value for the receiving period (Step ST31).

When the receiving time has come (Step ST32), reception is started (Step ST33), and at the same time, the field intensity detecting circuit 9-3 measures the field intensity (Step ST34).

After the reception has stopped (Step ST35), the receiving period processing part 9-1 sets a value proportional to the field intensity as a receiving period (Step ST36), and then waits until the next receiving time. At Step ST36, K is a fixed constant used to calculate a receiving period from the field intensity.

Figure 7:
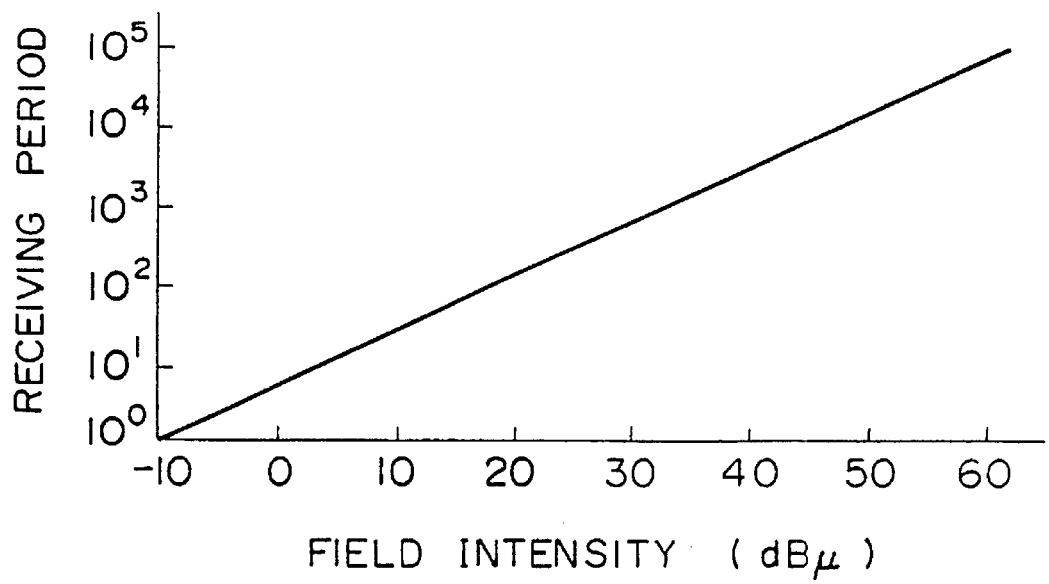
FIG. 7 is a graph showing one example of the relationship between the field intensity of the received radio wave and the receiving period in another embodiment of the digital automobile telephone shown in FIG. 2.

FIG. 7 is a graph showing one example of the relationship between the received signal field intensity and the receiving period in the embodiment of the present invention which is stated in claim 1, in which the axis of ordinates represents the receiving period, and the axis of abscissas represents the received signal field intensity. As will be understood from FIG. 7, the receiving period becomes longer in proportion to the received signal field intensity, thus enabling stable reception and saving electric power.

The digital automobile telephone according to another embodiment of the present invention, which is stated in claim 2, is the same as that shown in FIG. 2 in terms of the arrangement but different from it in the processing method for obtaining a receiving period, which is executed in the receiving period processing part 9-1.

Figure 5:
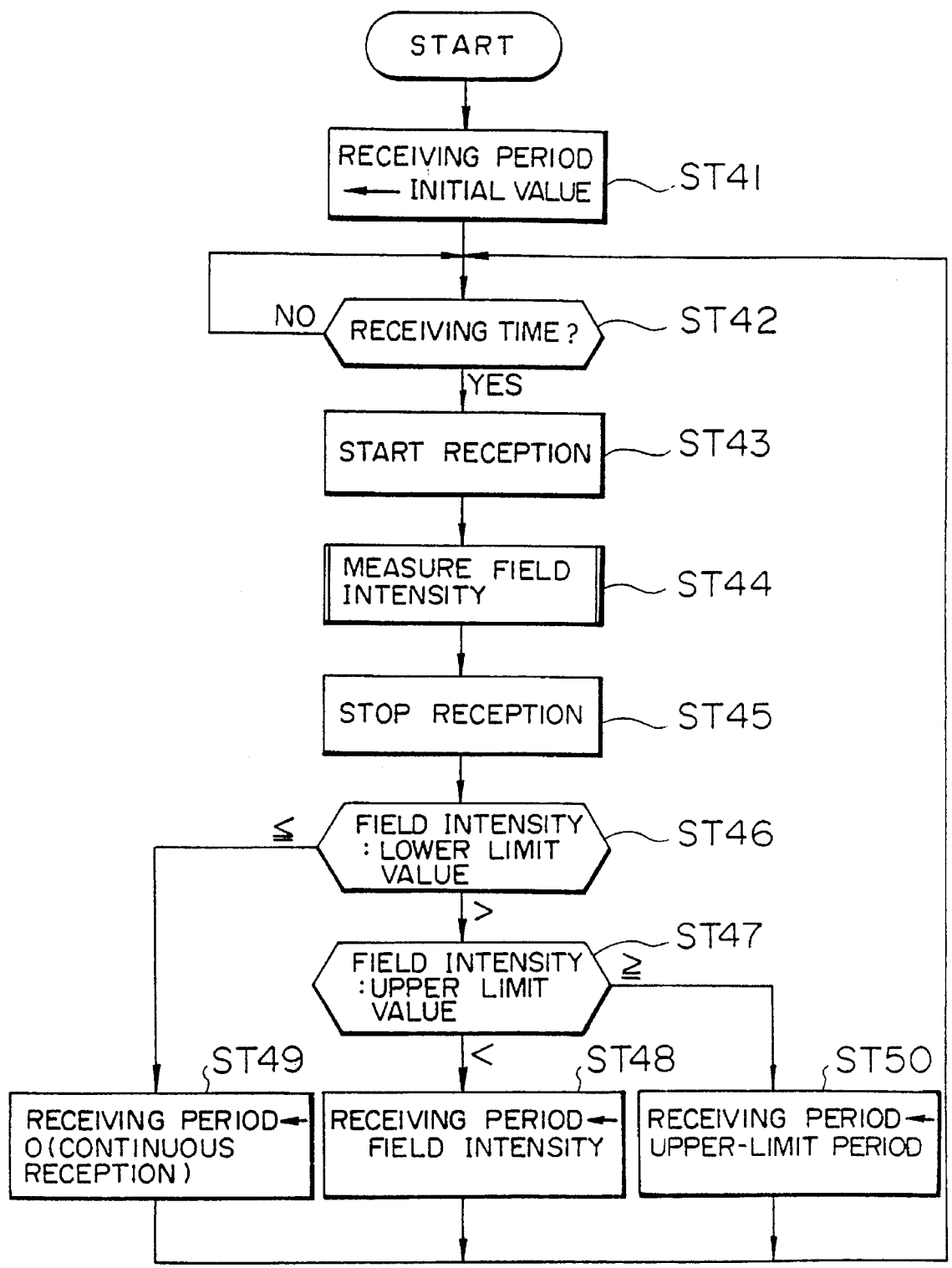
FIG. 5 is another control flowchart for one embodiment of the digital automobile telephone shown in FIG. 2.

FIG. 5 is a control flowchart for the embodiment of the present invention which is stated in claim 2. The receiving period control processing according to the second embodiment of the present invention will be explained below with reference to FIG. 5. This control flow is executed in the receiving period processing part 9-1. First, a fixed period is set as an initial value for the receiving period (Step ST41), and when the receiving time has come (Step ST42), reception is started (Step ST43). At the same time, the field intensity detecting circuit 9-3 measures the field intensity (Step ST44).

After the reception has stopped (Step ST45), if the received signal field intensity is not higher than a fixed lower limit value (Step ST46), continuous reception (receiving period=0) is set (Step ST49). If the received signal field intensity is not lower than a fixed upper limit value (Step ST47), an upper limit period corresponding thereto is set (Step ST50). If the received signal field intensity is higher than the fixed lower limit value and lower than the fixed upper limit value (Step ST47), a value proportional to the field intensity is set (Step ST48). Then, the receiving period processing part 9-1 waits until the next receiving time. At Step ST48, K is a fixed constant used to calculate a receiving period from the field intensity.

Figure 8:
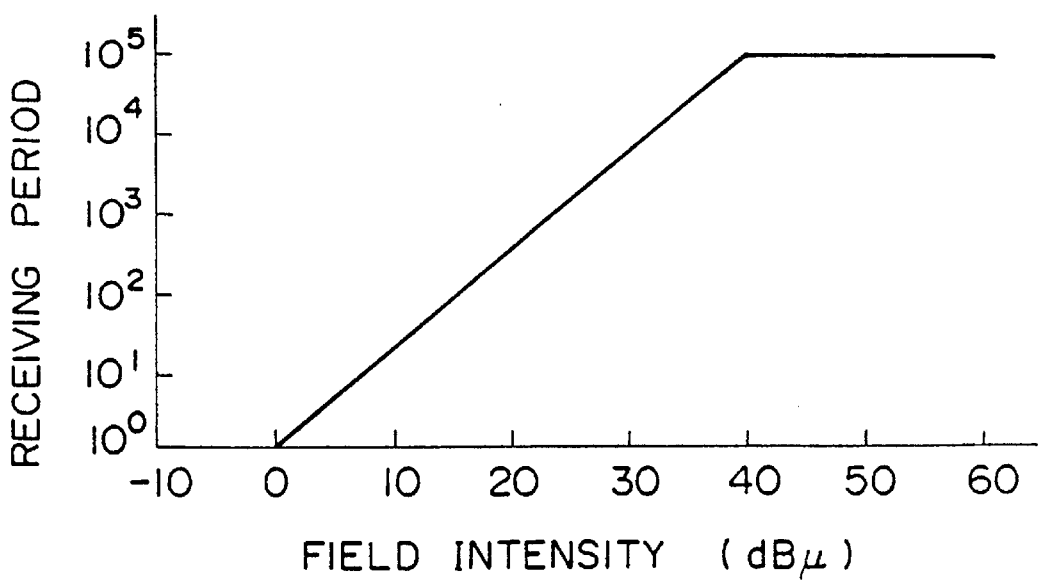
FIG. 8 is a graph showing another example of the relationship between the field intensity of the received radio wave and the receiving period in the digital automobile telephone shown in FIG. 2.

FIG. 8 is a graph showing one example of the relationship between the received signal field intensity and the receiving period in the embodiment of the present invention which is stated in claim 2, in which the axis of ordinates represents the receiving period, and the axis of abscissas represents the received signal field intensity. As will be understood from FIG. 8, when the received signal field intensity is not higher than the lower limit value, continuous reception is carried out, while the received signal field intensity is not lower than the upper limit value, reception is carried out at a predetermined period, and when the received signal field intensity is higher than the lower limit value and lower than the upper limit value, the receiving period becomes longer in proportion to the received signal field intensity, thus enabling stable reception and saving electric power.

Figure 3:
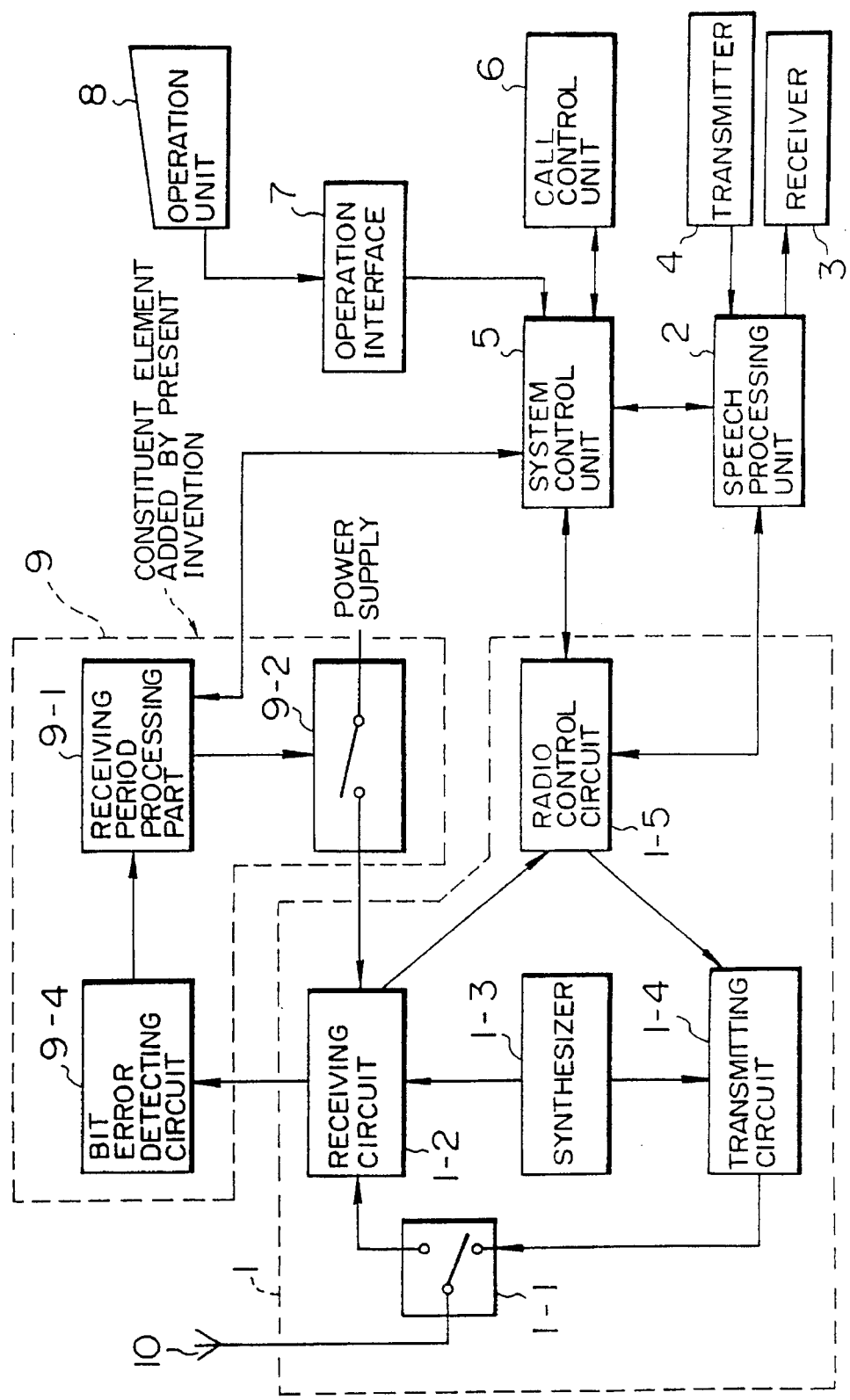
FIG. 3 is a block diagram showing another example of the arrangement of the digital automobile telephone according to the present invention.

FIG. 3 is a block diagram showing an example of the arrangement of a digital automobile telephone according to still another embodiment of the present invention which is stated in claim 3. As shown in FIG. 3, in this embodiment the field intensity detecting circuit 9-3, shown in FIG. 2, is replaced by a bit error detecting circuit 9-4.

The receiving period control unit 9 is controlled by the system control unit 5. When the telephone enters a waiting state, the receiving period control unit 9 begins its control operation. That is, the receiving period control unit 9 inputs the bit error rate of the signal received over a presently synchronized radio channel from the radio channel processing unit 1. The receiving period control unit 9 can set and change a BCCH receiving period according to the value of the bit error rate.

When the receiving time has come, the receiving period processing part 9-1 turns on the control switch 9-2 to connect the power supply to the receiving circuit 1-2, thereby activating the latter to send the received signal to the bit error detecting circuit 9-4.

The bit error detecting circuit 9-4 detects and measures bit errors from the received signal sent thereto and sends the detected bit error rate to the receiving period processing part 9-1.

The receiving period processing part 9-1 sets a receiving period according to the bit error rate sent thereto and controls the control switch 9-2 according to the receiving period.

In the meantime, the control signal in the received signal is sent to the system control unit 5 through the radio control circuit 1-5, while the voice signal is sent to the speech processing unit 2 where it is processed.

Figure 6:
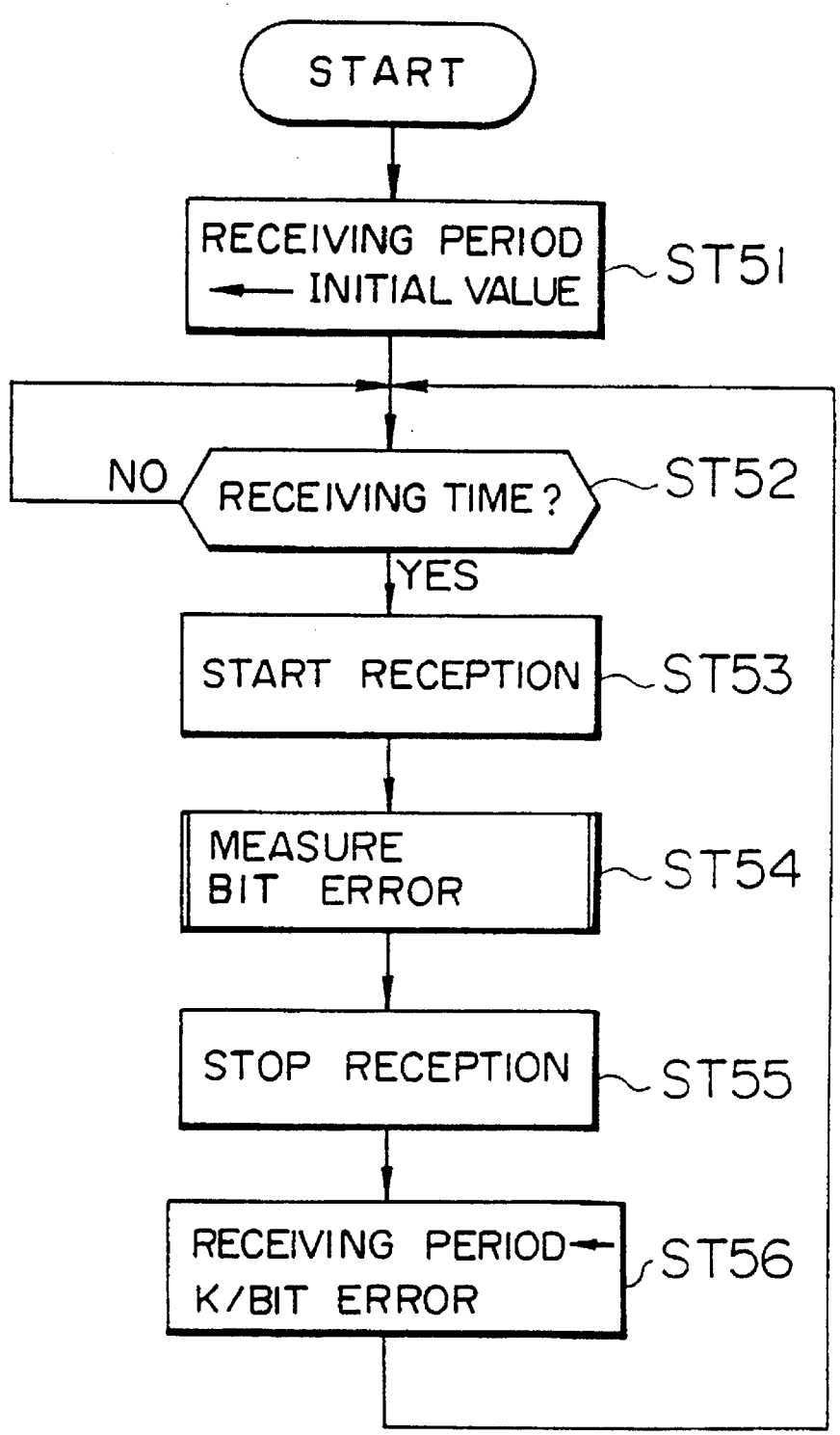
FIG. 6 is a control flowchart for the digital automobile telephone shown in FIG. 3.

FIG. 6 is a control flowchart for the embodiment of the present invention which is stated in claim 3. The receiving period control processing will be explained below with reference to the figure. The control flow is executed in the receiving period processing part 9-1. First, a fixed period is set as an initial value for the receiving period (Step ST51). When the receiving time has come (Step ST52), reception is started (Step ST53), and at the same time, measurement of bit errors is carried out (Step ST54). After the reception has stopped (Step ST55), the receiving period processing part 9-1 sets a value proportional to the reciprocal of the bit error rate as a receiving period (Step ST56), and then waits until the next receiving time. K in the figure is a fixed constant used to calculate a receiving period from the bit error rate.

Figure 9:
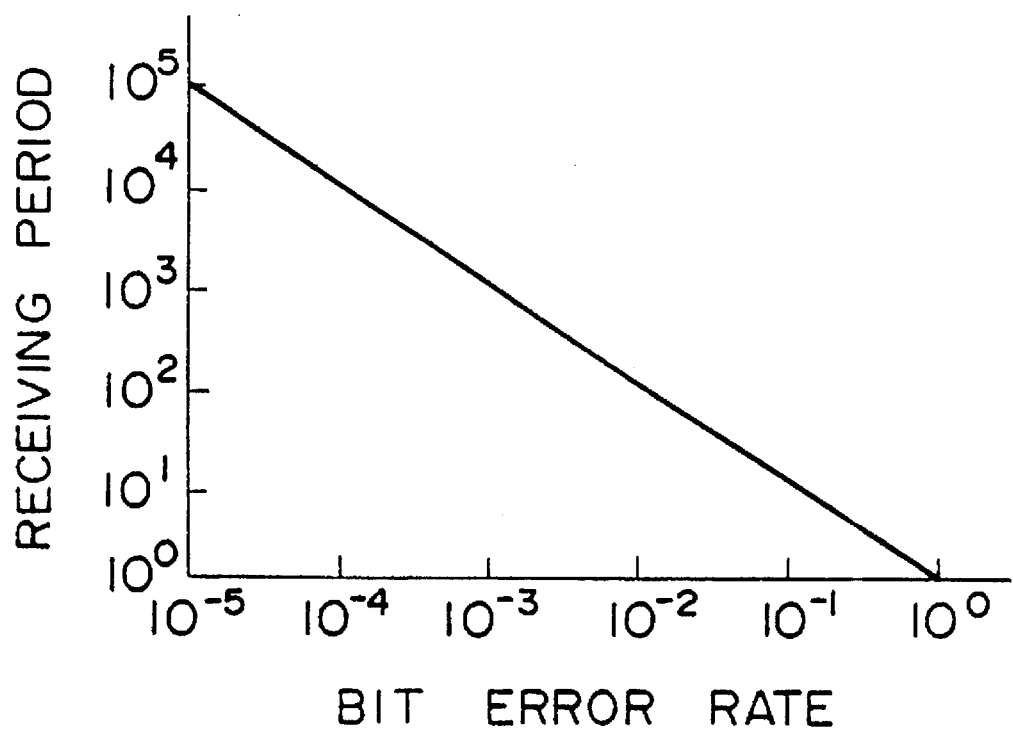
FIG. 9 is a graph showing one example of the relationship between the field intensity of the received radio wave and the receiving period in the digital automobile telephone shown in FIG. 3.

FIG. 9 is a graph showing one example of the relationship between the bit error rate and the receiving period in the embodiment of the present invention which is stated in claim 3, in which the axis of ordinates represents the receiving period, and the axis of abscissas represents the bit error rate. As will be understood from FIG. 9, the receiving period becomes longer as the bit error rate lowers, thereby enabling the electric power to be saved. When the bit error rate becomes high, continuous reception is carried out, thereby enabling stable reception.

Thus, according to the present invention, the receiving period is controlled so as to be optimized in accordance with the received signal field intensity in the receiving period control unit 9. Therefore, even if the field intensity of the radio wave sent from the base station is low, the mobile station can receive the BCCH signal even more stably.

In addition, when the field intensity of the received radio wave is high, the receiving period (sampling period) becomes relatively long, and hence the power supply for the receiving circuit can be cut off for a long period of time. Accordingly, the power consumption is minimized.

The present invention may be carried out in various other forms without departing from the spirit and essential features thereof. Therefore, the above-described embodiments are merely illustrative examples, and the present invention should not be construed as being limited to the described embodiments.

The technical scope of the present invention is defined by the appended claims, and it is not bound to this specification.

Furthermore, all changes and modifications within the technical scope of the claims come within the scope of the present invention.

What we claim is:

1. In an automobile telephone mobile station having a waiting control type receiver and a receiver power supply, a digital automobile telephone comprising:

field intensity detecting means for detecting a field intensity of a radio wave received by the mobile station, receiving period control means connected to the receiver and comprising a receiving period processor for setting a receiving period having a duration and for adjusting the duration of the receiving period in response to the detected field intensity, the receiving period processor comprising means for increasing the duration of the receiving period in response to an increase in the detected field intensity, and means for decreasing the duration of the receiving period in response to a decrease in the detected field intensity, and switching means responsive to the receiving period processor for controlling on/off switching of the power supply in response to the receiving period.

2. The apparatus of claim 1 wherein the means for decreasing the duration of the receiving period in response to a decrease in the detected field intensity comprises means for decreasing the duration of the receiving period to zero in response to a decrease in the detected field intensity below a certain value, whereby reception is carried out continuously.

3. In an automobile telephone mobile station having a waiting control type receiver and a receiver power supply, a digital automobile telephone comprising:

field intensity detecting means for detecting a field intensity of a radio wave received by the mobile station, receiving period control means connected to the receiver and comprising a receiving period processor for setting a receiving period having a duration and for adjusting the duration of the receiving period in response to the detected field intensity, including means for decreasing the duration of the receiving period to zero when the detected field intensity is not higher than a first value, whereby reception is carried out continuously, means for adjusting the duration of the receiving period in proportion to the detected field intensity when the detected field intensity is higher than the first value and lower than a second value, means for fixing the duration of the receiving period to a set value when the detected field intensity is not lower than the second value, and switching means responsive to the receiving period processor for controlling on/off switching of the power supply in response to the receiving period.

4. In an automobile telephone mobile station having a waiting control type receiver and a receiver power supply, a digital automobile telephone comprising:

bit error detecting means for detecting incidence of bit errors in a signal received by the mobile station, receiving period control means connected to the receiver and comprising a receiving period processor for setting a receiving period having a duration and for adjusting the duration of the receiving period in response to the incidence of detected bit errors in the signal received by the mobile station, the receiving period processor including means for increasing the duration of the receiving period in response to an decrease in the incidence of detected bit errors and means for decreasing the duration of the receiving period in response to a increase in the incidence of detected bit errors, and switching means responsive to the receiving period processor for controlling on/off switching of the power supply in response to the receiving period.

5. The apparatus of claim 4 wherein the means for decreasing the duration of the receiving period in response to an increase in the incidence of detected bit errors comprises means for decreasing the duration of the receiving period to zero in response to an increase in the incidence of detected bit errors above a certain value, whereby reception is carried out continuously.

* * * * *